D. C. WILLIAMS.
SPOOL AND IMPLEMENT HOLDER.
APPLICATION FILED JULY 1, 1912.
1,049,021.
Patented Dec. 31, 1912.
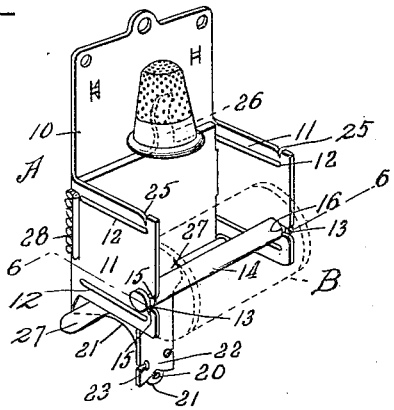
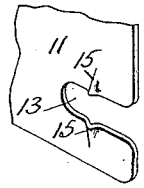
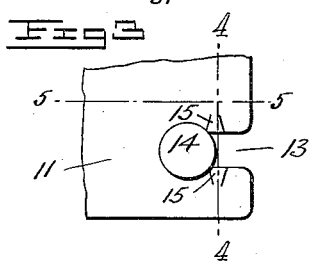
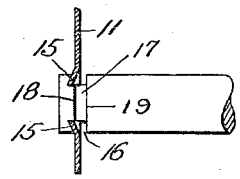
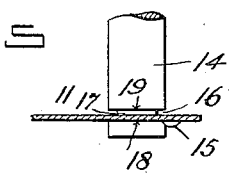
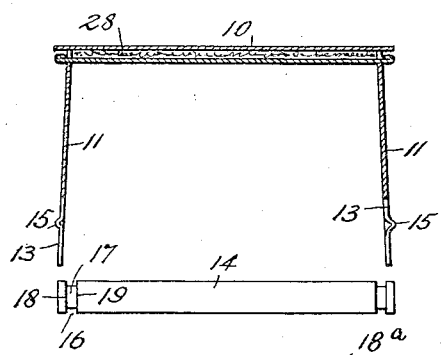
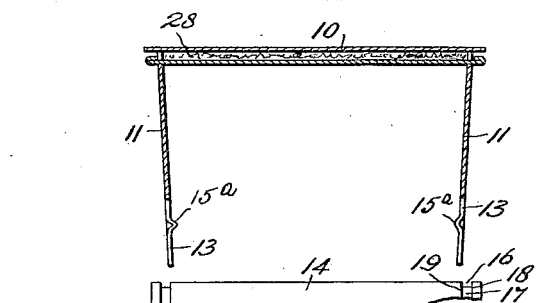
Inventor
David C. Williams
Witnesses
By
Attorney

UNITED STATES PATENT OFFICE.

DAVID C. WILLIAMS, OF WILKESON, WASHINGTON.

SPOOL AND IMPLEMENT HOLDER.

1,049,021.  Specification of Letters Patent.  Patented Dec. 31, 1912.

Application filed July 1, 1912. Serial No. 707,058.

*To all whom it may concern:*

Be it known that I, DAVID C. WILLIAMS, a citizen of the United States, residing at Wilkeson, in the county of Pierce and State of Washington, have invented new and useful Improvements in Spool and Implement Holders, of which the following is a specification.

This invention relates to a device for holding articles used in sewing, and has for its object to provide a neat, simple and efficient article which may be attached to the dress or suspended from a cord or ribbon for holding in compact and convenient form a spool of thread, a thimble, needles and pins, and to be also provided with a thread tension and thread cutting means; the invention being an improvement on a similar device patented by me on April 30, 1912, No. 1,024,958.

A more particular object of the invention is directed to the novel means for mounting the spool shaft in the brackets provided therefor, which while holding said shaft firmly and non-rotatably in position permits ready removal of the same when it is desired to change or renew the spool of thread.

With this principal object in view the invention consists of the novel construction and arrangement of parts hereinafter described in detail and pointed out in the claims, and illustrated in the accompanying drawing, in which:

Figure 1 is a perspective view of the device. Fig. 2 is a similar view of a portion of one of the shaft supporting brackets showing the shaft retaining slot or recess. Fig. 3 is a side view of the same portion of the bracket enlarged. Fig. 4 is a sectional view on the line 4—4 of Fig. 3. Fig. 5 is a similar view on the line 5—5. Fig. 6 is a horizontal sectional view of the device on the line 6—6 of Fig. 1 with the shaft removed. Fig. 7 is a similar view of a modification. Fig. 8 is a detailed view of a modified form of spool shaft which may be employed.

Like reference characters are used for the same parts in all the figures.

In the drawing, A indicates the frame of the holder comprising a back plate 10, made preferably of thin, resilient metal, provided near its lower end with two slightly diverging brackets 11 projecting forwardly from the edges of the plate preferably stiffened at their top and bottom edges by horizontal ribs 12. In the forward edge of each bracket 11, nearer the bottom than the top, is a horizontal slot or recess 13, said slots forming seats for a shaft 14 on which a spool of thread is carried and turns. Each end of the shaft 14 has a circumferential groove 16 therein forming a neck 17 and two shoulders 18 and 19, the distance between said grooves being less than the distance between the outer ends of the bracket 11.

A shaft thus formed is positioned in the brackets by grasping with one hand the shaft 14 with a spool B on it and taking in the other hand the frame A and pressing together the brackets sufficiently to permit the necks 17 on the shaft entering easily into the slots or recesses 13. The brackets are then released from pressure and springing outwardly, the brackets at the edges or borders of the slots 13 bear with sufficient force against the shoulders 18 on the shaft to hold it in place in the slots. To more securely retain the shaft within the slots the edges of said slots just in advance of the shaft, after the latter are seated, are provided with outwardly projecting lugs or stops 15, conveniently formed by pressing the metal of the brackets from the inside, thus causing it to bulge outwardly as shown. These stops or lugs lie in front of the projecting ends of the shaft and, in connection with the resiliency of the brackets 11 form a perfectly secure fastening for the shaft, preventing it from falling out or being shaken out, but permitting its ready withdrawal when it is desired to remove the shaft or spool for any purpose. The lugs or stops 15 project over the shoulders 18 only far enough to serve the purpose intended, so that when the brackets are again pressed together the lugs will be withdrawn from the shoulders into the grooves 16 of the shaft and permit the shaft to be removed from the slots 13 without trouble. Instead of grooving the ends of the shaft 14, projecting ribs 18$^a$ may be formed thereon, as in Fig. 8, but a grooved shaft is preferred.

If desired the brackets 11 may be made slightly convergent, as in Fig. 7, in which case they will need to be spread apart when seating the shaft 14 in the recesses or slots 13, and further the lugs 15$^a$ should project from the inner side of the brackets and extend over the shoulders 19 of the shaft as is evident.

From the spool B the thread passes through an eye 20 in a depending finger 21, in front of which is a second finger 22 provided with a notch 23 in each side within which notches the spool thread is placed before passing to the eye 20, thereby forming a tension for said thread.

The holder is provided with a knife 25 on each bracket by means of which the thread may be severed; there is also a spring finger 26 to hold a thimble; means for carrying a needle case 27, and also means 28 for holding the pins, all as set forth in my previous patent and for which no claim is made herein.

What I claim is,—

1. A device of the class described, comprising a back plate provided with projecting resilient brackets having slots to receive the ends of the spool shaft, and a spool shaft formed with a shoulder on each end, said shoulders being spaced apart a distance differing from the distance between said slots whereby the brackets are placed under tension when the shaft is seated therein and bear on said shoulders, and means carried by and movable with said brackets when the latter are sprung to receive said shaft which freely pass the shoulders on the shaft and engage in front thereof to retain the shaft in the slots.

2. A device of the class described, comprising a back plate provided with projecting resilient brackets having slots to receive the spool shaft, a spool shaft formed with a shoulder on each end, said shoulders being spaced apart a distance differing from the distance between said slots, whereby the brackets are placed under tension when the shaft is seated therein and bear on said shoulders, and lugs on the brackets adapted to slip easily past the shoulders when the shaft is placed therein and project in front of said shoulders to retain the shaft in the slots.

3. A device of the class described, comprising a back plate provided with divergent resilient brackets having slots to receive the ends of a spool shaft, said spool shaft formed with a shoulder on each end, said shoulders being nearer together than said slots whereby said brackets must be sprung together to seat the shaft in the slots, and a lug on each side of each slot adapted to lie in front of the shoulders on the shaft and project over said shoulders to retain the shaft in the slots, said shoulders being held in place by the spring tension of the brackets.

4. A device of the class described comprising a back plate provided with projecting resilient brackets having slots to receive the ends of a shaft, said shaft being formed with a shoulder on each end, said shoulders being spaced apart a distance differing from the distance between the slots in the brackets, whereby when the shaft is seated in said slots the brackets will bear with a spring tension against said shoulders, and a lug projecting from the side of each bracket and integral therewith adapted to lie in front of and over the shoulders of the shaft when the latter is seated to retain the shaft in the slots.

5. A device of the class described, comprising a back plate provided with projecting brackets for supporting a spool shaft, a finger having an eye therein projecting from said back plate, through which eye the thread from a spool mounted on said shaft passes, and a second finger overlying the first-named finger and provided with slots to receive the thread before passing through said eye to form a tension for the thread.

In testimony whereof I have hereunto set my hand in presence of two subscribing witnesses.

DAVID C. WILLIAMS.

Witnesses:
PHILIP WALTERS,
THOMAS S. WILLIAMS.